United States Patent
Kim

(10) Patent No.: US 8,779,608 B2
(45) Date of Patent: Jul. 15, 2014

(54) CONSTRUCTION MACHINE HAVING POWER GENERATION FUNCTION

(75) Inventor: Ji Yun Kim, Changwon-si (KR)

(73) Assignee: Volvo Construction Equipment Holding Sweden AB, Eskilstna (SE)

( * ) Notice: Subject to any disclaimer, the term of this patent is extended or adjusted under 35 U.S.C. 154(b) by 912 days.

(21) Appl. No.: 12/945,963

(22) Filed: Nov. 15, 2010

(65) Prior Publication Data

US 2011/0115418 A1     May 19, 2011

(30) Foreign Application Priority Data

Nov. 19, 2009 (KR) .................. 10-2009-0112006

(51) Int. Cl.
*H02K 35/00* (2006.01)
(52) U.S. Cl.
USPC ................................................... 290/1 R
(58) Field of Classification Search
USPC .................................................. 290/1 R, 7
See application file for complete search history.

(56) References Cited

U.S. PATENT DOCUMENTS

| | | | |
|---|---|---|---|
| 2004/0036295 A1* | 2/2004 | Nakagawa et al. | 290/31 |
| 2008/0317574 A1 | 12/2008 | Moriya et al. | |
| 2011/0049902 A1* | 3/2011 | Miekka et al. | 290/55 |

FOREIGN PATENT DOCUMENTS

| | | |
|---|---|---|
| EP | 1 267 072 A2 | 12/2002 |
| JP | 2002-235338 A | 8/2002 |
| JP | 2009-127647 A | 6/2009 |
| WO | 2008/149502 A1 | 12/2008 |

OTHER PUBLICATIONS

European Search Report dated Feb. 17, 2011 for European Patent Application No. 101951543.7-2316.
espacent English abstract of JP 2002-235338 A.
espacent English abstract of JP 2009-127647 A.
espacent English abstract of EP 1 267 072 A2.
espacent English abstract of WO 2008/149502 A1.

* cited by examiner

*Primary Examiner* — Tho D Ta
(74) *Attorney, Agent, or Firm* — Ladas & Parry LLP

(57) ABSTRACT

A swing system of a construction machine having a power generation function is provided. The construction machine includes a lower driving structure capable of traveling, an upper swing structure mounted on an upper portion of the lower driving structure and provided with a working device, a swing ring gear fixed to the lower driving structure, a swing ring gear cover fixed to the upper swing structure and engaged with the swing ring gear to perform a rotational operation, a permanent magnet installed on one of the swing ring gear and the swing ring gear cover, and an induction coil installed on the other of the swing ring gear and the swing ring gear cover. Induction current is generated in the induction coil in accordance with the rotational operation of the swing ring gear cover.

4 Claims, 2 Drawing Sheets

CONSTRUCTION MACHINE HAVING POWER GENERATION FUNCTION

CROSS-REFERENCE TO RELATED APPLICATION

This application is based on and claims priority from Korean Patent Application No. 10-2009-112006, filed on Nov. 19, 2009 in the Korean Intellectual Property Office, the disclosure of which is incorporated herein in its entirety by reference.

BACKGROUND OF THE INVENTION

1. Field of the Invention

The present invention relates to a construction machine, and more particularly to a construction machine having a power generation function that generates induction current using rotational operation of an upper swing structure.

2. Description of the Prior Art

A general construction machine includes a lower driving structure and an upper swing structure, and the upper swing structure is mounted on the lower driving structure to be swiveled. A working device is installed on the upper swing structure.

A swing device for connecting the upper swing structure to the lower driving structure to be swiveled is implemented by a hydraulic swing system.

As illustrated in FIG. 1, a hydraulic swing system in the related art is rotated by hydraulic fluid being supplied from a hydraulic pump. However, the hydraulic swing system in the related art merely performs a rotational operation, but is not provided with a device for converting rotational energy into electrical energy.

Due to this, most of the kinetic energy generated in a standstill state is lost through heat and friction.

SUMMARY OF THE INVENTION

Accordingly, the present invention has been made to solve the above-mentioned problems occurring in the prior art while advantages achieved by the prior art are maintained intact.

An embodiment of the present invention relates to an improvement of energy efficiency by generating induction current through an induction coil using the rotational operation of an upper swing structure.

In one aspect of the present invention, there is provided a construction machine, which includes a lower driving structure capable of traveling; an upper swing structure mounted on an upper portion of the lower driving structure and provided with a working device; a swing ring gear fixed to the lower driving structure; a swing ring gear cover fixed to the upper swing structure and engaged with the swing ring gear to perform a rotational operation; a permanent magnet installed on one of the swing ring gear and the swing ring gear cover; and an induction coil installed on the other of the swing ring gear and the swing ring gear cover; wherein induction current is generated in the induction coil in accordance with the rotational operation of the swing ring gear cover.

The construction machine as constructed above according to an embodiment of the present invention has the following advantages.

First, the rotational operation energy of the upper swing structure can be converted into electrical energy.

Second, since the converted electrical energy can be stored in a separate energy storage device, the energy can be efficiently used.

Third, since the generation of the induction current can be controlled by a control unit, only the rotational operation energy being wasted can be converted into the electrical energy.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
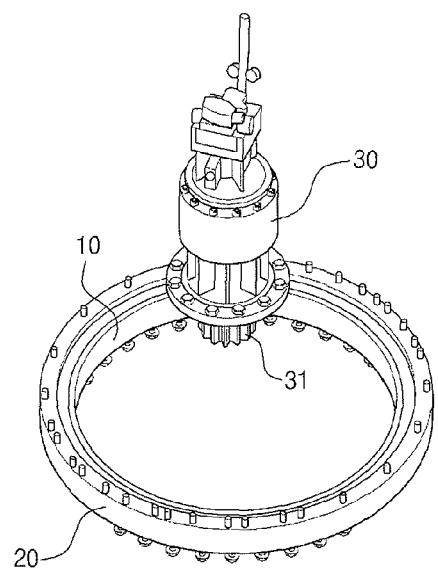
FIG. 1 is a perspective view of a construction machine in the related.

Hereinafter, a hydraulic cylinder cushion device according to preferred embodiments of the present invention will be described with reference to the accompanying drawings. In the drawings, thicknesses of lines, sizes of the constituent elements, or the like may be exaggerated for clarity in explanation.

Also, the spatially defined wordings in consideration of the functions of the present invention may differ in accordance with a user's or operator's intention or custom, and the definition of such wordings should be made based on the contents throughout the entire description of the present invention.

In addition, the matters defined in the description, such as the detailed construction and elements, are nothing but specific details provided to assist those of ordinary skill in the art in a comprehensive understanding of the invention, and thus the embodiments including constituent elements which are included in the entire description of the present invention and are replaceable as equivalents of the constituent elements in the claims may be included in the scope of the present invention.

Figure 2:
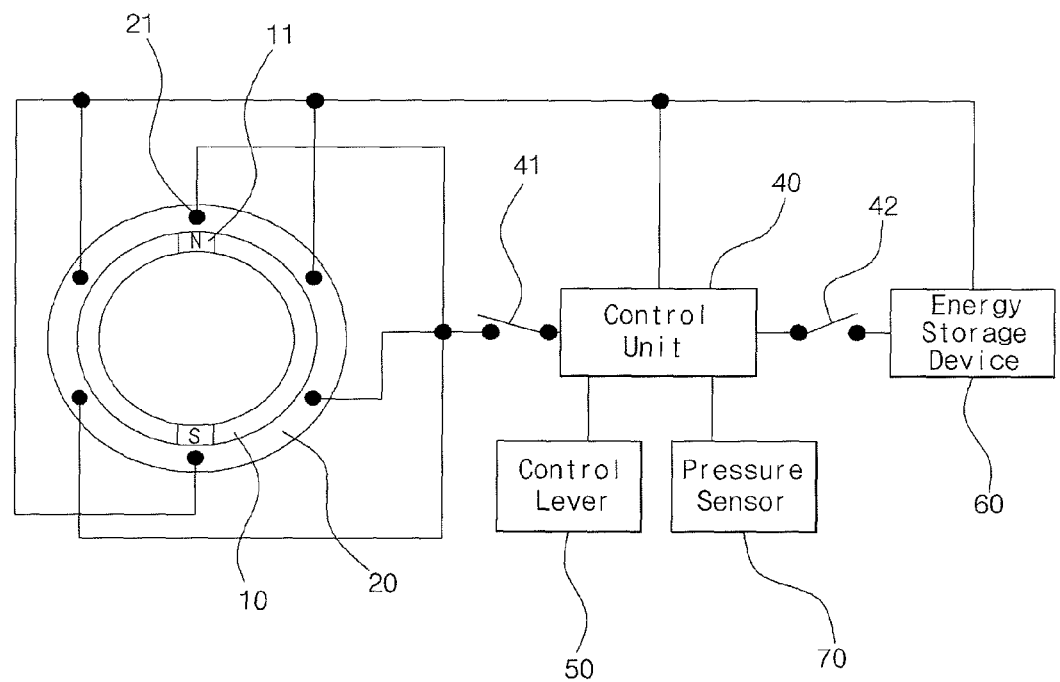
FIG. 2 is a block diagram illustrating the configuration of a construction machine according to an embodiment of the present invention.
Figure 3:
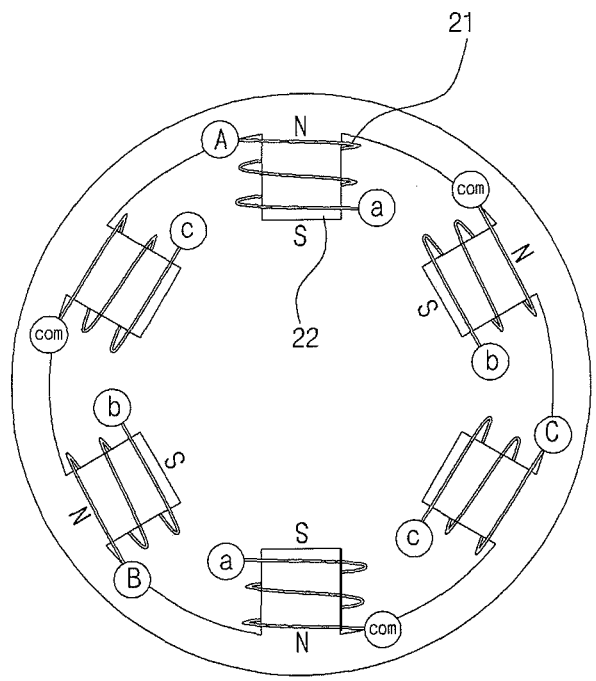
FIG. 3 is a cross-sectional view of an induction coil of the construction machine of FIG. 2.
Figure 3:
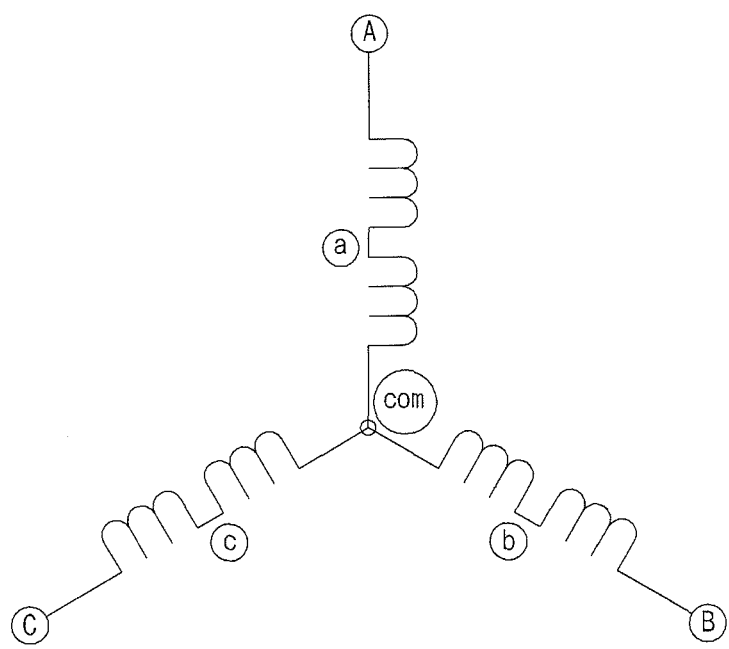

FIG. 1 is a perspective view of a construction machine in the related. FIG. 2 is a block diagram illustrating the configuration of a construction machine according to an embodiment of the present invention, and FIG. 3 is a cross-sectional view of an induction coil of the construction machine of FIG. 2.

A construction machine having a power generation function according to a preferred embodiment of the present invention includes a lower driving structure capable of traveling; an upper swing structure mounted on an upper portion of the lower driving structure and provided with a working device; a swing ring gear 10 fixed to the lower driving structure; a swing ring gear cover 20 fixed to the upper swing structure and engaged with the swing ring gear 10 to perform a rotational operation; a permanent magnet 11 installed on one of the swing ring gear 10 and the swing ring gear cover 20; and an induction coil 21 installed on the other of the swing ring gear 10 and the swing ring gear cover 20; wherein induction current is generated in the induction coil 21 in accordance with the rotational operation of the swing ring gear cover 20.

The construction machine includes the lower driving structure and the upper swing structure mounted on the lower driving structure to be swiveled in the left or right direction when a driving means operates. The rotational operation of the upper swing structure against the lower driving structure is implemented by a hydraulic swing system.

As illustrated in FIG. 1, the swing system according to an embodiment of the present invention includes the swing ring gear 10 and the swing ring gear cover 20 in the same manner as the swing system in the related art.

The swing ring gear cover 20 is fixed to the upper swing structure, and if the swing ring gear cover 20 is rotated, the upper swing structure is also rotated. By contrast, the swing ring gear 10 is fixed to the lower driving structure, and is not rotated during a swing operation.

On one of the swing ring gear 1 and the swing ring gear cover 20, the permanent magnet 11 is installed, and on the other thereof, the induction coil 21 is installed. As illustrated in FIG. 2, it is possible that the permanent magnet 11 is formed on the swing ring gear 10, and the induction coil 21 is formed on the swing ring gear cover 20. Of course, it is also possible that the induction coil 21 is formed on the swing ring gear 10 and the permanent magnet 11 is formed on the swing ring gear cover 20.

As illustrated in FIG. 2, if the induction coil 21 that is accommodated in the swing ring gear cover 20 is rotated, induction current is generated in the induction coil 21 by Faraday's law.

In the construction machine having a power generation function according to a preferred embodiment of the present invention, the induction coil 21 is wound on a plurality of magnetic projections 22 radially formed toward the swing ring gear 10 or the swing ring gear cover 20 on which the permanent magnet 11 is installed.

As illustrated in FIG. 3, a plurality of magnetic projections 22 are formed on the swing ring gear cover 20, and are radially arranged in the direction of the swing ring gear 10 on which the permanent magnet 11 is installed. In the case where the permanent magnet 11 is formed on the swing ring gear cover 20 and the induction coil 21 is formed on the swing ring gear 10, it is also possible that the magnetic projections 22 are radially formed toward the outer side.

As illustrated in FIG. 3, the induction coil 21 is wound on the plurality of magnetic projections 22 formed on the swing ring gear cover 20. If the induction coil 21 is rotated, the induction current is generated in the induction coil 21. The induction current is in proportion to the number of windings of the coil and the cross-sectional area of the magnetic body on which the coil is wound according to Faraday's law, and is expressed by the following equation.

$$\varepsilon = N\mu_0 nA \frac{d\phi}{dt}$$

In this equation, N is the number of windings of the induction coil 21, and A is the cross-sectional area of the magnetic projection 22 on which the induction coil 21 is wound. Accordingly, the amount of power generation can be changed by properly adjusting the number of windings of the induction coil 21 and the cross-sectional area of the magnetic projection 22.

As illustrated in FIG. 3, it is possible that the induction coil 21 is connected in a star connection method. The star connection method is a connection method using voltage, whereby one end of each coil is connected to a center point and the other thereof is drawn out. In the star connection method, a line voltage is twice a phase voltage. Since the line voltage is high in the star connection, a high voltage is generated during a low-speed rotation.

The construction machine having a power generation function according to an embodiment of the present invention further includes a hydraulic swing motor 30 that is rotatable using an inflow and outflow of hydraulic fluid supplied from a hydraulic pump, and a pinion gear 31 that is rotated by the hydraulic swing motor 30. The pinion gear 31 is engaged with the swing ring gear 10 to rotate the upper swing structure.

As illustrated in FIG. 1, if the hydraulic swing motor 30 is rotated, the pinion gear 31 that is on the lower side of the hydraulic swing motor 30 is also rotated. The hydraulic swing motor 30 is rotated by the hydraulic fluid supplied from the hydraulic pump.

The hydraulic swing motor 30 rotates the pinion gear 31 in a state where it is fixed to the upper swing structure. The pinion gear 31 is engaged with the swing ring gear 10 to be rotated, and thus the upper swing structure is rotated. That is, if the pinion gear 31 is rotated clockwise, the swing ring gear 10 that is engaged with the pinion gear 31 rotates the swing ring gear cover 20, and thus the upper swing structure that is fixed to the swing ring gear cover 20 is rotated.

The construction machine having a power generation function according to an embodiment of the present invention further includes a pressure sensor 70 sensing hydraulic pressure in the swing motor 30 and outputting an electrical signal; a control lever 50 manipulating the upper swing structure in a swing operation state or in a swing stop state; a control unit 40 receiving signals of the pressure sensor 70 and the control lever 50 and making the induction coil 21 generate induction current in the case where it is judged that the swing motor 30 is in a speed reduction state; and a control switch 41 formed between the control unit 40 and the induction coil 21 to be short-circuited in the case where the generation of the induction current is desired and to be open in the case where the generation of the induction current is not desired.

As illustrated in FIG. 2, the construction machine further includes the pressure sensor 70, the control lever 50, the control unit 40, and the control switch 41.

The pressure sensor 70 is a sensor sensing the hydraulic pressure in the swing motor 30, and the control lever 50 manipulates the swing system.

The control unit 40 judged whether the swing motor 30 is in an acceleration state or in a speed reduction state through output signals of the pressure sensor 70 and the control lever 50, and makes the induction coil 21 generate the induction current only in the case where the swing motor 30 is in a speed reduction state. If the control unit 40 is not provided, the induction coil 21 generates the induction current even in the case where the swing motor 30 is in the acceleration state, and thus the operation of the swing system becomes unreasonable.

The control switch 41, which is formed between the control unit 40 and the induction coil 21, is short-circuited in the case where the generation of the induction current is desired and is open in the case where the generation of the induction current is not desired. Accordingly, it is possible to generate electrical energy only in the case where a user desires to generate the induction current through the control switch 41.

The construction machine having a power generation function according to an embodiment of the present invention further includes an energy storage device 60 collecting the induction current generated in the induction coil 21 and storing the collected induction current as electrical energy.

As illustrated in FIG. 2, the construction machine according to an embodiment of the present invention further includes the energy storage device 60. A battery is used as the energy storage device 60, and the battery may be a dry battery, a battery, a hydrogen battery, or the like.

The construction machine having a power generation function according to an embodiment of the present invention further includes a selection switch 42 formed between the energy storage device 60 and the control unit 40 to be short-circuited in the case where the storage of the induction current is desired and to be open in the case where the storage of the induction current is not desired.

As illustrated in FIG. 2, the selection switch 42, which is formed between the control unit 40 and the energy storage device 60, is short-circuited in the case where the storage of the induction current is desired and is open in the case where the storage of the induction current is not desired. Accordingly, it is possible to store the electrical energy only in the case where a user desires to store the induction current through the selection switch 42.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A construction machine comprising:
   a lower driving structure capable of traveling;
   an upper swing structure mounted on an upper portion of the lower driving structure and provided with a working device;
   a swing ring gear fixed to the lower driving structure;
   a swing ring gear cover fixed to the upper swing structure and engaged with the swing ring gear to perform a rotational operation;
   a permanent magnet installed on one of the swing ring gear and the swing ring gear cover;
   an induction coil installed on the other of the swing ring gear and the swing ring gear cover;
   a hydraulic swing motor that is rotatable using an inflow and outflow of hydraulic fluid supplied from a hydraulic pump;
   a pinion gear that is rotated by the hydraulic swing motor, wherein the pinion gear is engaged with the swing ring gear to rotate the upper swing structure;
   a pressure sensor sensing hydraulic pressure in the hydraulic swing motor and outputting an electrical signal;
   a control lever manipulating the upper swing structure in a swing operation state or in a swing stop state;
   a control unit receiving signals of the pressure sensor and the control lever and making the induction coil generate induction current in the case where it is judged that the hydraulic swing motor is in a speed reduction state; and
   a control switch formed between the control unit and the induction coil to be short-circuited in the case where the generation of the induction current is desired and to be open in the case where the generation of the induction current is not desired;
   wherein induction current is generated in the induction coil in accordance with the rotational operation of the swing ring gear cover.

2. The construction machine according to claim 1, wherein the induction coil is wound on a plurality of magnetic projections radially formed toward the swing ring gear or the swing ring gear cover on which the permanent magnet is installed.

3. The construction machine according to claim 1, further comprising an energy storage device collecting the induction current generated in the induction coil and storing the collected induction current as electrical energy.

4. The construction machine according to claim 3, further comprising a selection switch formed between the energy storage device and the control unit to be short-circuited in the case where the storage of the induction current is desired and to be open in the case where the storage of the induction current is not desired.

* * * * *